US012781534B2

(12) United States Patent
Nye

(10) Patent No.: US 12,781,534 B2
(45) Date of Patent: Nov. 3, 2026

(54) REKEYABLE LOCK CYLINDER

(71) Applicant: Schlage Lock Company LLC, Carmel, IN (US)

(72) Inventor: James Nye, Colorado Springs, CO (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

(21) Appl. No.: 19/059,832

(22) Filed: Feb. 21, 2025

(65) Prior Publication Data

US 2026/0250983 A1 Aug. 27, 2026

(51) Int. Cl.
*E05B 27/00* (2006.01)

(52) U.S. Cl.
CPC ........ *E05B 27/0017* (2013.01); *E05B 27/005* (2013.01); *E05B 27/0082* (2013.01)

(58) Field of Classification Search
CPC . E05B 27/0017; E05B 27/005; E05B 27/0082
USPC ........................................................... 70/492
See application file for complete search history.

(56) References Cited

U.S. PATENT DOCUMENTS

| | | | | |
|---|---|---|---|---|
| 2,755,656 | A | 7/1956 | Schwartz | |
| 3,700,301 | A | 10/1972 | Boeck | |
| 4,637,240 | A | 1/1987 | Nevalainen et al. | |
| 6,860,131 | B2 | 3/2005 | Armstrong et al. | |
| 8,561,444 | B2 | 10/2013 | Loreti | |
| 12,188,258 | B1 * | 1/2025 | Farag | E05B 27/005 |
| 2005/0016234 | A1 | 1/2005 | Strader et al. | |
| 2016/0265249 | A1 * | 9/2016 | Zhang | E05B 29/004 |
| 2022/0316238 | A1 * | 10/2022 | Rufang | E05B 27/0082 |
| 2023/0102123 | A1 * | 3/2023 | Farag | E05B 27/0082 70/384 |
| 2024/0229507 | A1 * | 7/2024 | Farag | E05B 27/083 |
| 2024/0271461 | A1 * | 8/2024 | Huang | E05B 29/004 |

FOREIGN PATENT DOCUMENTS

| | | |
|---|---|---|
| CN | 203462871 U | 3/2014 |

OTHER PUBLICATIONS

International Search Report; ISA/US; International Application No. PCT/US2026/016222; Jun. 3, 2026; 4 pages.
Written Opinion of the International Searching Authority; ISA/US; International Application No. PCT/US2026/016222; Jun. 3, 2026; 10 pages.

* cited by examiner

*Primary Examiner* — Nathan Cumar
(74) *Attorney, Agent, or Firm* — Taft Stettinius & Hollister LLP

(57) ABSTRACT

An exemplary rekeyable lock cylinder generally includes a shell, a plug, and a tumbler mechanism. The shell extends along a longitudinal axis, and the plug is mounted for rotation about the longitudinal axis. The tumbler mechanism is operable to selectively prevent rotation of the plug relative to the shell. The tumbler mechanism is slidable along a lateral axis and generally includes a key follower having a first engagement feature, and a tumbler component having a plurality of second engagement features operable to engage the first engagement feature. The plurality of second engagement features are regularly spaced along an entire lateral length of the tumbler component.

20 Claims, 8 Drawing Sheets

REKEYABLE LOCK CYLINDER

TECHNICAL FIELD

The present disclosure generally relates to rekeyable lock cylinders, and more particularly but not exclusively relates to rekeyable lock cylinders including features that facilitate manufacture and/or discourage tampering.

BACKGROUND

Rekeyable lock cylinders generally include a plurality of recodable tumbler mechanisms, each including a pair of tumbler components that selectively engage one another to define a key code for the lock cylinder. However, it has been found that certain lock cylinders of this type may suffer from various drawbacks and limitations, such as those related to ease of manufacture and/or susceptibility to certain types of tampering and/or attack. For these reasons among others, there remains a need for further improvements in this technological field.

SUMMARY

An exemplary rekeyable lock cylinder generally includes a shell, a plug, and a tumbler mechanism. The shell extends along a longitudinal axis, and the plug is mounted for rotation about the longitudinal axis. The tumbler mechanism is operable to selectively prevent rotation of the plug relative to the shell. The tumbler mechanism is slidable along a lateral axis and generally includes a key follower having a first engagement feature, and a tumbler component having a plurality of second engagement features operable to engage the first engagement feature. The plurality of second engagement features are regularly spaced along an entire lateral length of the tumbler component. Further embodiments, forms, features, and aspects of the present application shall become apparent from the description and figures provided herewith.

DETAILED DESCRIPTION OF ILLUSTRATIVE EMBODIMENTS

Figure 1:
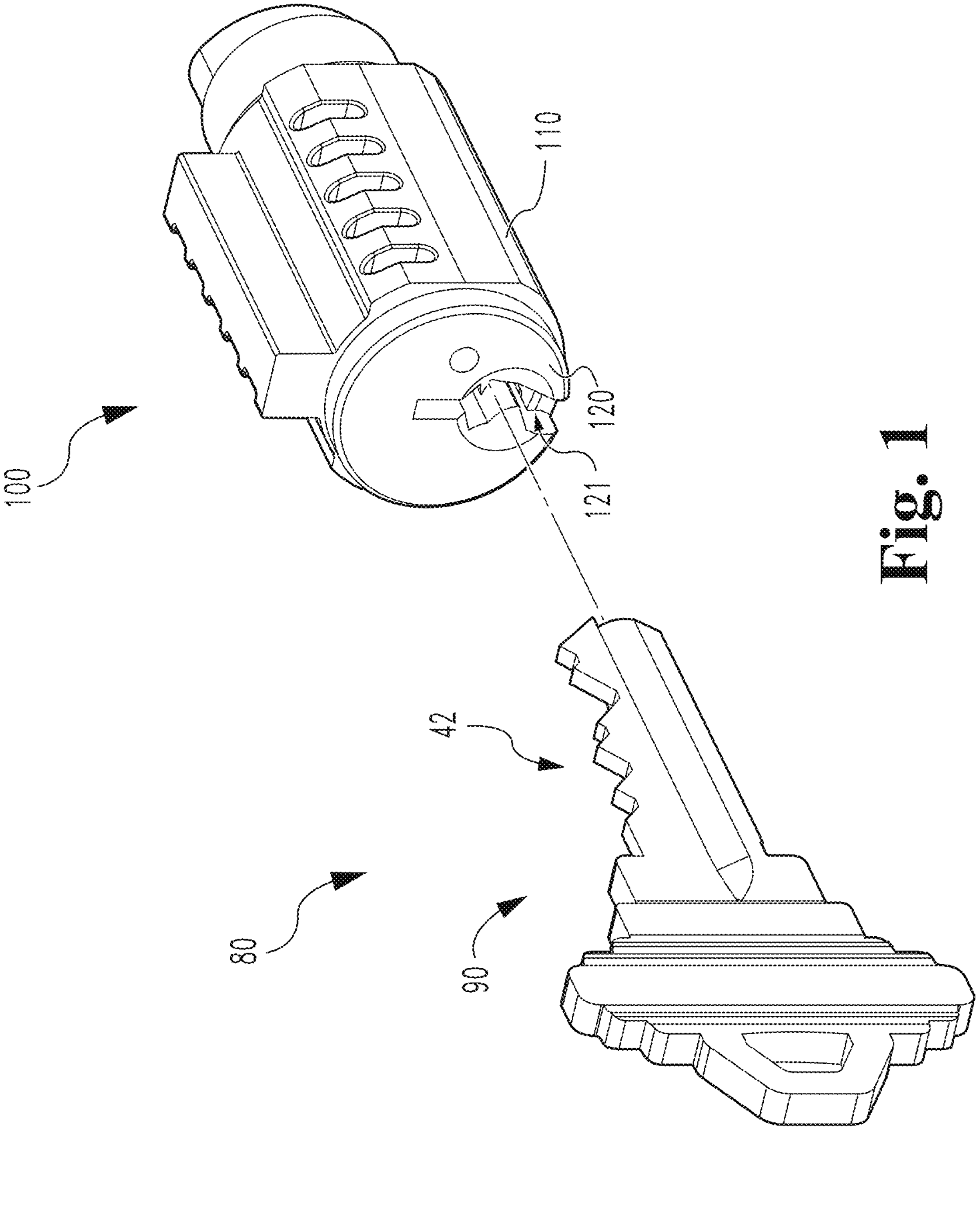
FIG. 1 is a perspective view of a lock system including a rekeyable lock cylinder according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the terms "longitudinal," "lateral," and "transverse" may be used to denote motion or spacing along three mutually perpendicular axes, wherein each of the axes defines two opposite directions. These terms are used for ease and convenience of description, and are without regard to the orientation of the system with respect to the environment. For example, descriptions that reference a longitudinal direction may be equally applicable to a vertical direction, a horizontal direction, or an off-axis orientation with respect to the environment. Furthermore, motion or spacing along a direction defined by one of the axes need not preclude motion or spacing along a direction defined by another of the axes. For example, elements that are described as being "laterally offset" from one another may also be offset in the longitudinal and/or transverse directions, or may be aligned in the longitudinal and/or transverse directions.

Moreover, the term "transverse" may also be used to describe motion or spacing that is non-parallel to a particular axis or direction. For example, an element that is described as being "movable in a direction transverse to the longitudinal axis" may move in a direction that is perpendicular to the longitudinal axis and/or in a direction oblique to the longitudinal axis. The terms are therefore not to be construed as limiting the scope of the subject matter described herein to any particular arrangement unless specified to the contrary.

Certain components may be described herein as being "rotationally coupled" or "rotatably coupled." As used herein, the term "rotationally coupled" indicates that two or more components are coupled for joint rotation, whereas the term "rotatably coupled" indicates that the components are rotatable relative to one another.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

With reference to FIG. 1, illustrated therein is a rekeyable lock system 80 according to certain embodiments. The lock system 80 generally includes a rekeyable lock cylinder 100 according to certain embodiments, and a key 90 operable to actuate the lock cylinder 100.

Figure 2:
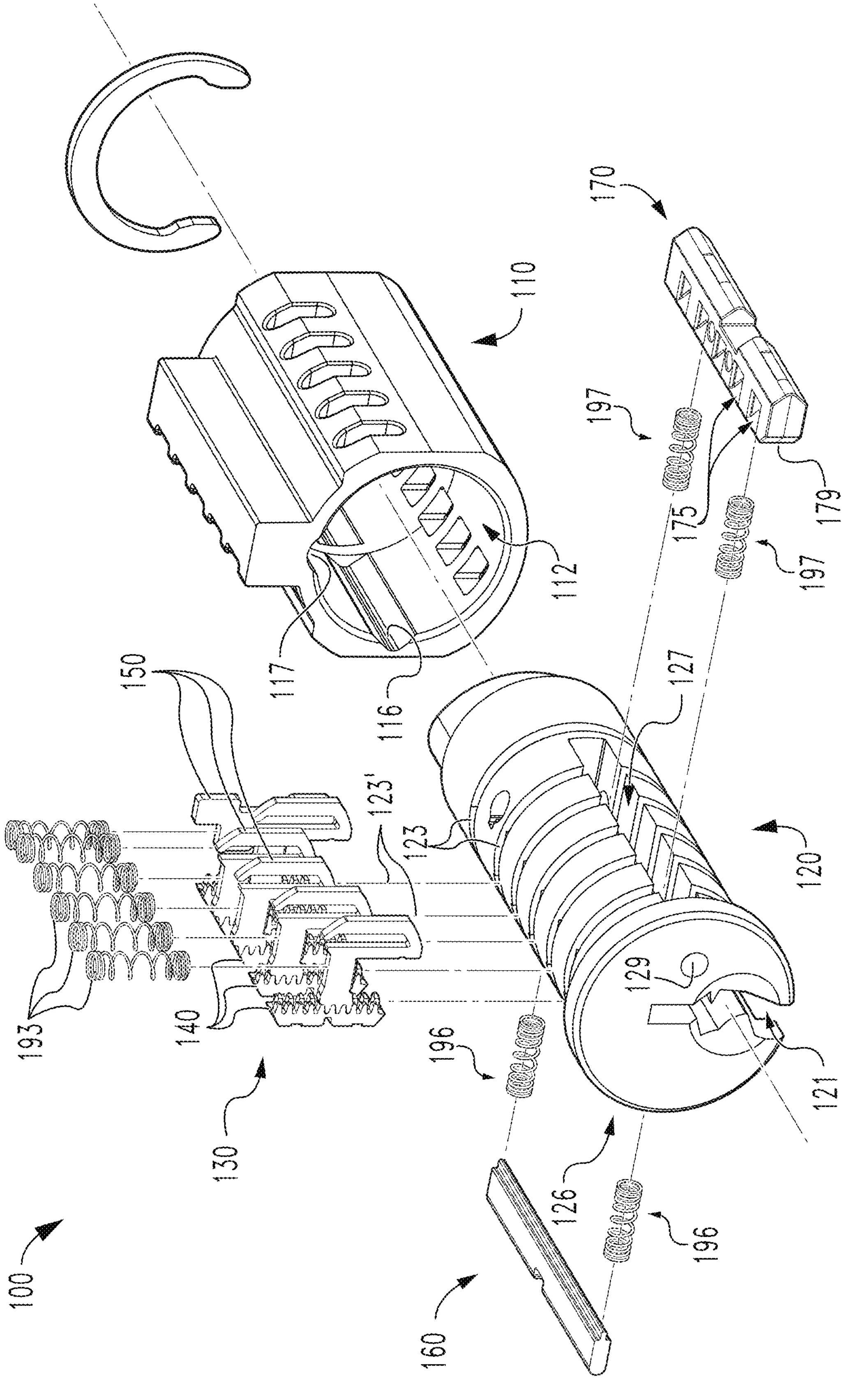
FIG. 2 is an exploded assembly view of the rekeyable lock cylinder illustrated in FIG. 1.

With additional reference to FIG. 2, the lock cylinder 100 generally includes a shell 110, a plug 120 rotatably mounted in the shell 110, and a plurality of tumbler mechanisms 130 operable to selectively prevent rotation of the plug 120 relative to the shell 110. Each of the tumbler mechanisms 130 generally includes a tumbler component 140 and a key follower 150 that is selectively engaged with the tumbler component 140. As described herein, the illustrated lock cylinder 100 further includes a locking sidebar 160 that is slidably mounted in the plug 120 and aids in selectively preventing rotation of the plug 120, and a rekey sidebar 170 operable to selectively transition the tumbler mechanisms 130 between engaged and disengaged states to thereby permit rekeying of the lock cylinder 100.

The shell 110 generally includes a chamber 112 operable to rotatably receive the plug 120, a locking sidebar groove 116 operable to receive a portion of the locking sidebar 160, and a rekey sidebar groove 117 operable to receive a portion of the rekey sidebar 170. The chamber 112 extends along a longitudinal axis 101 of the lock cylinder 100, and each of the grooves 116, 117 extends longitudinally along the side of the chamber 112.

The plug 120 is mounted in the chamber 112 for rotation about the longitudinal axis 101, and generally includes a longitudinally-extending keyway 121, a plurality of tumbler shafts 123 operable to slidably receive the tumbler mechanisms 130, a locking sidebar channel 126 in which the locking sidebar 160 is slidably seated for radial movement, and a rekey sidebar channel 127 in which the rekey sidebar 170 is slidable seated for radial movement. Each of the tumbler shafts 123 extends along a corresponding lateral axis 123', and each tumbler mechanism 130 is slidable along the corresponding lateral axis 123'.

Figure 3:
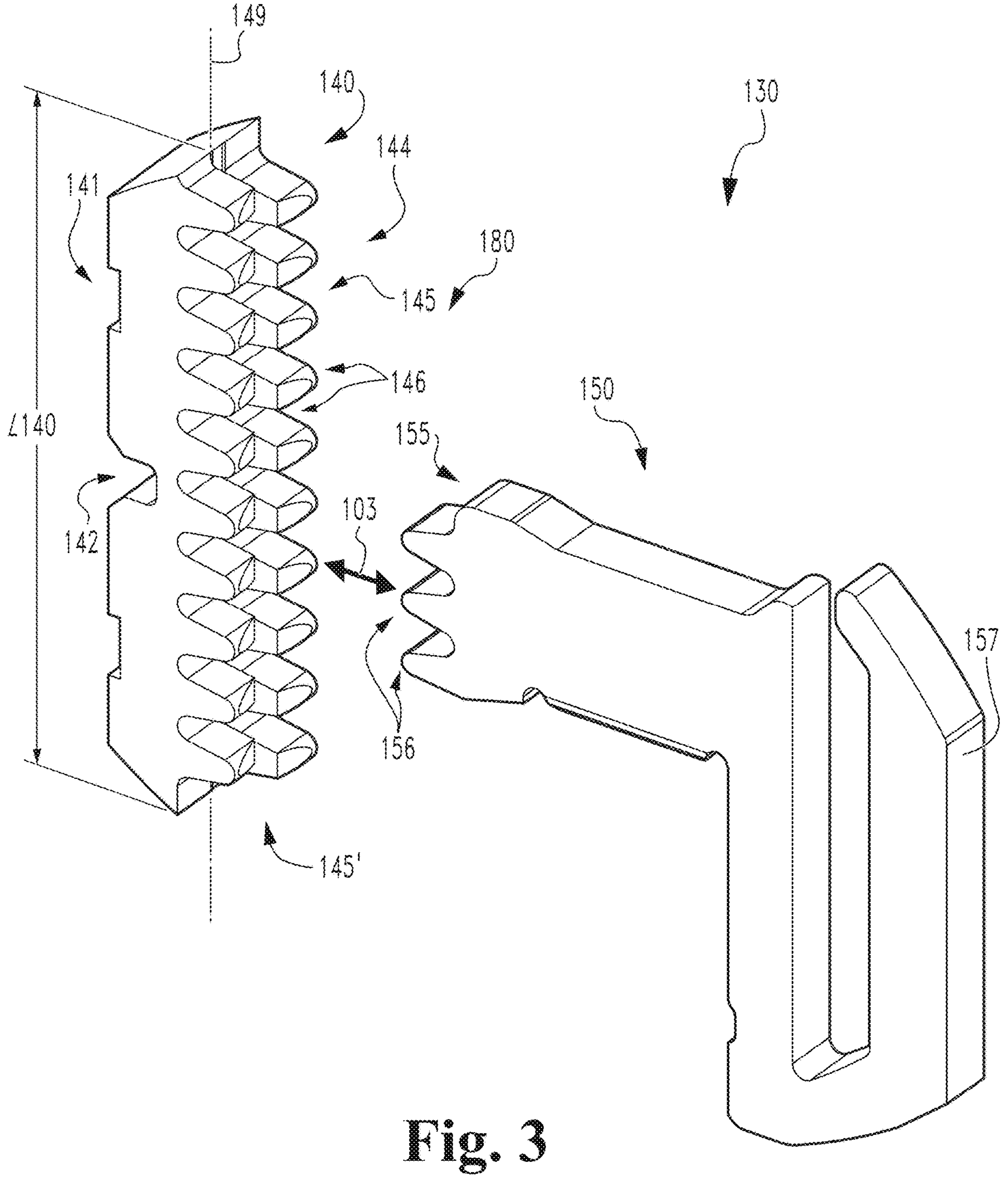
FIG. 3 is an exploded assembly view of a recodable tumbler mechanism according to certain embodiments.

With additional reference to FIG. 3, each tumbler mechanism 130 generally includes a tumbler component 140 and a key follower 150, and each tumbler mechanism 130 has an engaged state and a disengaged state. With the tumbler mechanism 130 in the engaged state (FIG. 2), the tumbler component 140 and the key follower 150 are engaged with one another for joint movement along the lateral axis 123'. With the tumbler mechanism 130 in the disengaged state (FIG. 3), the tumbler component 140 and the key follower 150 are disengaged from one another to thereby permit lateral movement of the key follower 150 relative to the tumbler component 140.

Each tumbler component 140 has a radially outer side 141 including a groove 142, and a radially inner side 144 including an engagement region 145 operable to engage the key follower 150. As described herein, the groove 142 aligns with a ridge 162 of the locking sidebar 160 when the tumbler mechanism 130 is in an unlocking position to selectively permit radially inward movement of the locking sidebar 160. The engagement region 145 includes a plurality of engagement features 146, each of which is operable to engage a corresponding engagement feature 156 of the corresponding key follower 150. In the illustrated form, the engagement region 145 is provided as a rack 145' in which the engagement features 146 are provided in the form of teeth and recesses defined between the teeth. It is also contemplated that the engagement region 145 may be provided in another form, such as one in which the engagement features 146 comprise scallops.

The tumbler component 140 has a length dimension L140 that extends along the long axis 149 of the tumbler component 140. When installed to the tumbler shaft 123, the long axis 149 of the tumbler component 140 extends along the lateral axis 123'. As such, the length dimension L140 may alternatively be referred to herein as the lateral length of the tumbler component 140. In the illustrated form, the engagement region 145 extends along the entirety of the length dimension L140 such that the engagement features 146 are defined along the entirety of the inner side 144 of the tumbler component 140. As such, the illustrated tumbler component 140 may be referred to as a fully-toothed tumbler component. Moreover, the illustrated engagement features 146 are evenly spaced along the lateral length L140 such that the engagement features 146 are provided at constant intervals along the lateral length L140. As described herein, the fully-toothed nature of the tumbler component 140 may facilitate manufacture of the lock cylinder 100 and/or discourage tamper attacks on the lock cylinder 100.

Each key follower 150 is mounted in a corresponding tumbler shaft 123 and selectively engaged with a corresponding tumbler component 140. During insertion of the key 90, the key follower 150 rides along a top cut 92 of the key 90 such that the lateral position of the key follower 150 corresponds to the root depth of the key 90 at the point of engagement. As such, when the key 90 is fully inserted, the lateral positions of the key followers 150 correspond to the bitting code of the key 90. Each key follower 150 also includes a finger 157 that is received in an aperture 175 of the rekey sidebar 170 to thereby couple the key follower 150 with the rekey sidebar 170 for joint movement along a transverse axis 103 that is transverse to the longitudinal axis 101 and the lateral axes 123'.

Each key follower 150 includes an engagement region 155 including one or more engagement features 156. The key follower engagement region 155 is operable to engage the tumbler component engagement region 145 in each of a plurality of different relative positions to thereby define different unlocking positions for the tumbler mechanism 130. The key follower engagement region 155 and the tumbler component engagement region 145 may be considered to define a selective coupling 180 operable to selectively couple the tumbler component 140 and the key follower 150 for joint lateral movement.

Figure 5:
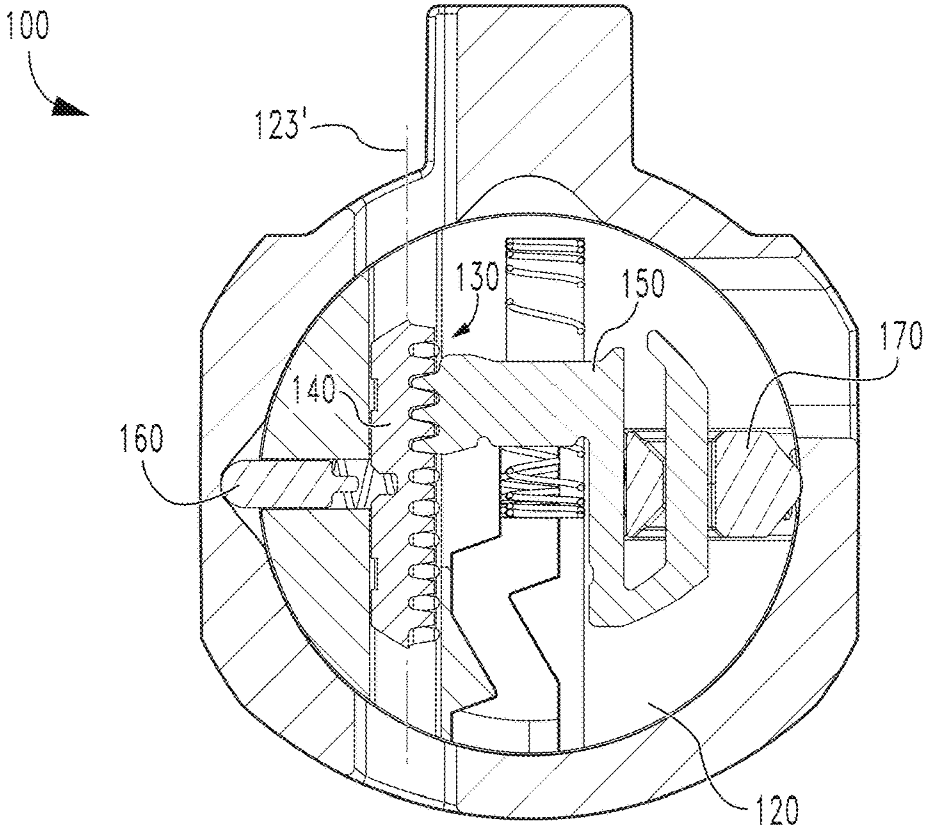
FIG. 5 is a cross-sectional illustration of the rekeyable lock cylinder with the tumbler mechanism in a locking position.
Figure 6:
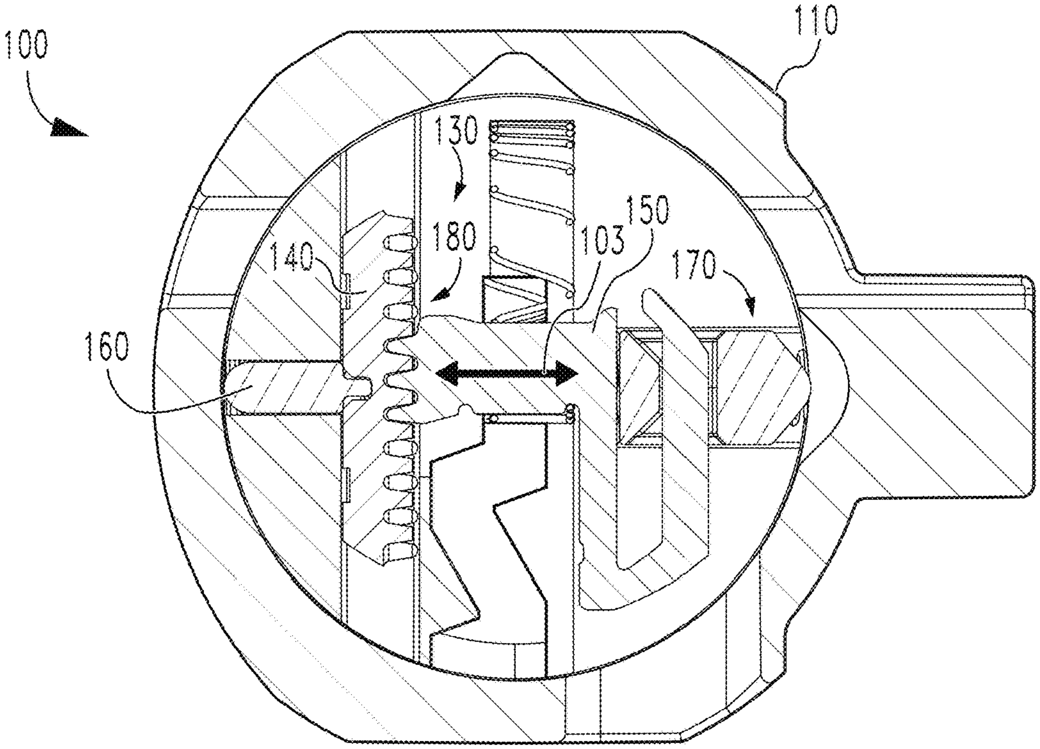
FIG. 6 is a cross-sectional illustration of the rekeyable lock cylinder with the tumbler mechanism in an engaged state.
Figure 7:
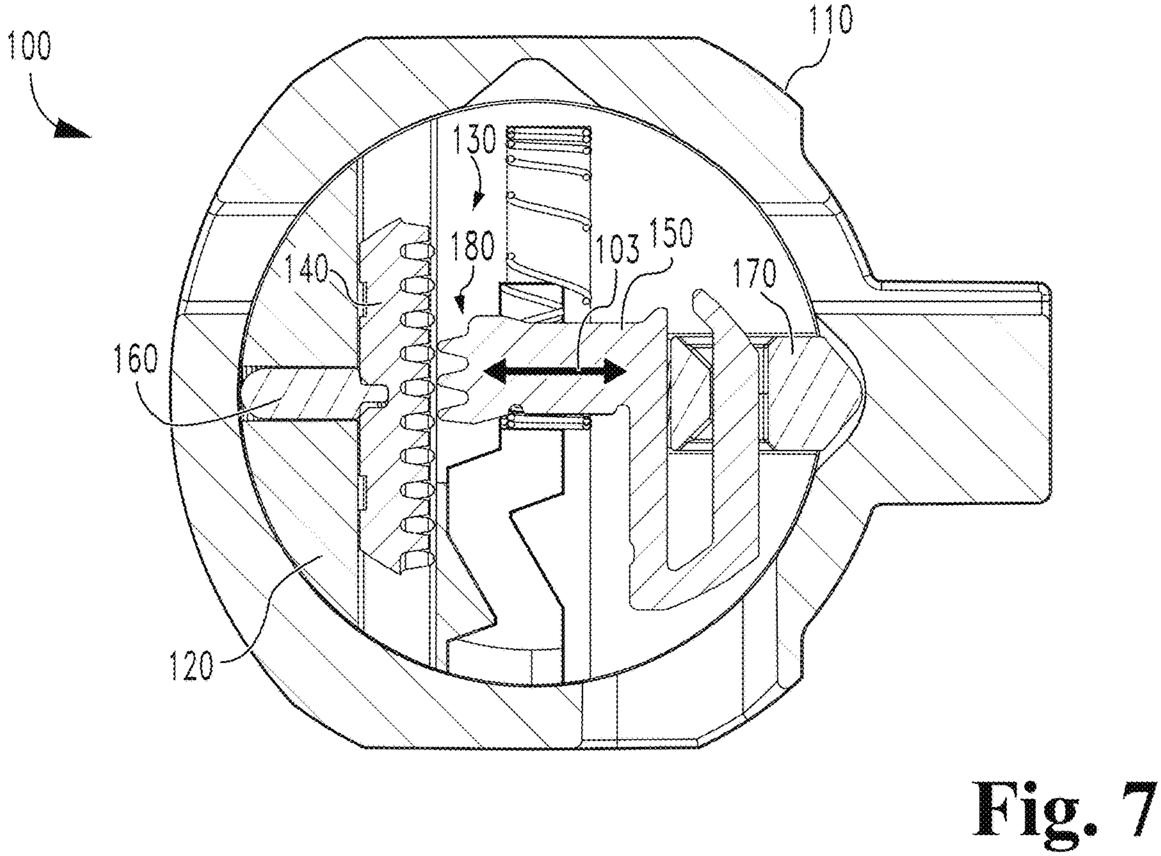
FIG. 7 is a cross-sectional illustration of the rekeyable lock cylinder with the tumbler mechanism in a disengaged state.

The locking sidebar 160 is slidably seated in the locking sidebar channel 126 for radial movement between a radially outer blocking position (FIGS. 4 and 5) and a radially inner unblocking position (FIGS. 6 and 7). The locking sidebar 160 may be biased toward the radially outer position, for example by one or more locking sidebar springs 196. The radially outer side of the locking sidebar 160 defines a cam surface 161 operable to engage the locking sidebar groove 116, and the radially inner side of the locking sidebar 160 defines a ridge 162 operable to engage the tumbler mechanisms 130. As described herein, the locking sidebar 160 cooperates with the tumbler mechanisms 130 to selectively prevent rotation of the plug 120 relative to the shell 110.

The rekey sidebar 170 is slidably seated in the rekey sidebar channel 127 for radial movement between a radially inner operating position (FIG. 6) and a radially outer rekey position (FIG. 7). The rekey sidebar 170 may be biased toward the radially outer position, for example by one or more rekey sidebar springs 197. With the key followers 150 coupled to the rekey sidebar 170 via the fingers 157, radially outer movement of the rekey sidebar 170 moves the key followers 150 transversely away from the tumbler components 140, thereby disengaging the selective couplings 180 and moving the tumbler mechanisms 130 to their disengaged states.

Figure 4:
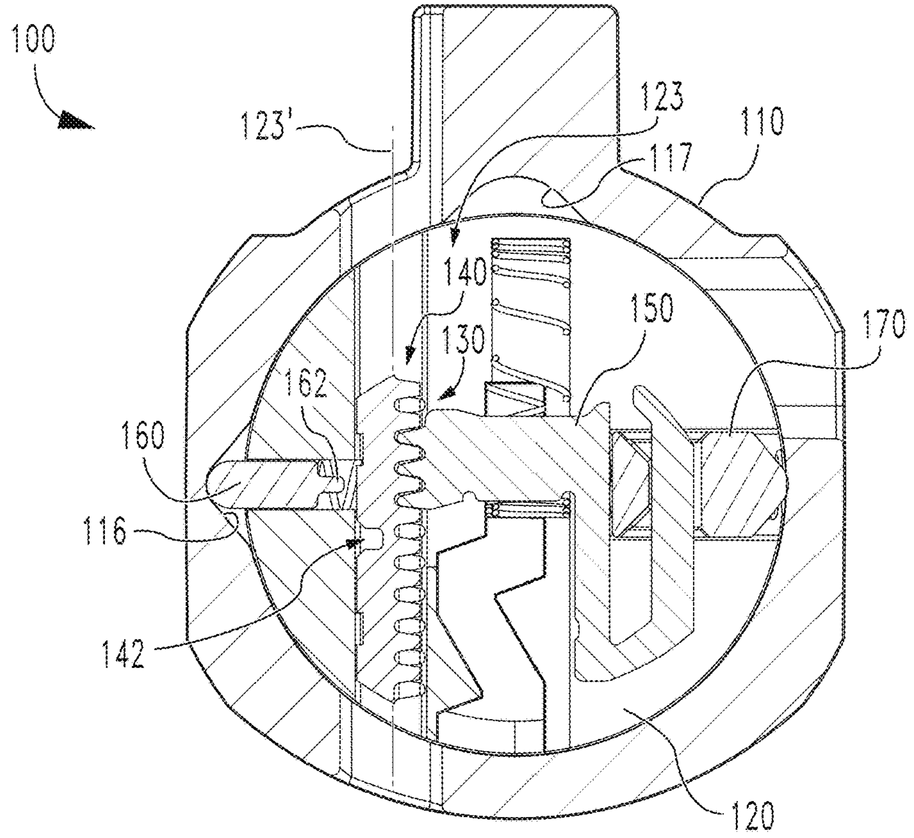
FIG. 4 is a cross-sectional illustration of the rekeyable lock cylinder with the tumbler mechanism in an unlocking position.

With additional reference to FIGS. 4 and 5, when a tumbler mechanism 130 is in its engaged state, the tumbler mechanism 130 has a locking position (FIG. 4) and an unlocking position (FIG. 5). In the locking position (FIG. 4), the groove 142 and the ridge 162 are misaligned such that the ridge 162 cannot enter the groove 142. When the user attempts to rotate the plug 120, camming action of the cam surface 161 and the locking sidebar groove 116 drives the locking sidebar 160 radially inward. This inward movement is stopped by engagement of the ridge 162 with the outer side 141 of the tumbler component such that the locking sidebar 160 is retained in its radially outer locking position and thereby prevents rotation of the plug 120. However, when the appropriate key 90 is inserted, the key 90 moves the tumbler mechanism 130 to its unlocking position. With the tumbler mechanism 130 in its unlocking position (FIG. 5), the ridge 162 is aligned with the groove 142 such that the locking sidebar 160 is permitted to cam radially inward to its unlocking position in response to an attempted rotation of the plug 120.

With additional reference to FIGS. 6 and 7, once the tumbler mechanisms 130 have been placed in their unlocking positions, the plug 120 is operable to be rotated relative to the shell 110 from a home position (FIGS. 4 and 5) to a rekey position (FIGS. 6 and 7). For ease and convenience of description, the frame of reference used herein is tied to the plug 120 and therefore rotates with the plug 120. Stated another way, the frame of reference for FIGS. 4-7 remains with the plug 120 such that it appears that the shell 110 has been rotated by 90° from the orientation of FIGS. 4 and 5 to that of FIGS. 6 and 7.

With the plug 120 in its rekey position (FIGS. 6 and 7), the rekey sidebar 170 is aligned with the rekey sidebar groove 117. The rekey sidebar 170 may then move from its radially inward operating position (FIG. 6) to its radially outer rekey position (FIG. 7) to thereby decouple the selective coupling 180 and move the tumbler mechanism 130 from its engaged state to its disengaged state. The radially outward movement of the rekey sidebar 170 may, for example, be in response to the radially-outward urging of the rekey sidebar springs 197. Additionally or alternatively, a tool may be inserted through an aperture 129 in the plug 120 to engage a chamfer 179 of the rekey sidebar 170 and thereby drive the rekey sidebar 170 to its rekey position.

FIG. 7 illustrates the lock cylinder 100 in a rekey state. In this state, the selective couplings 180 are decoupled such that each of the tumbler mechanisms 130 is in its disengaged state. Moreover, for each of the tumbler mechanisms 130, the key follower 150 is disengaged from the corresponding tumbler component 140, which is held in its unlocking position by the locking sidebar 160. As such, the key followers 150 are free to move laterally relative to the tumbler components 140, thereby enabling removal of the inserted key 90 while the plug 120 remains in its rekey position. Another key 90 with a different bitting profile may then be inserted into the keyway 121, thereby placing the key followers 150 in new unlocking positions. When the plug 120 is then rotated from its rekey position, the rekey sidebar groove 117 cams the rekey sidebar 170 radially inward, thereby re-engaging the selective couplings 180 and returning the tumbler mechanisms 130 to their engaged states. The new key 90 is now operable to actuate the lock cylinder 100, and can be removed from the keyway 121 upon return of the plug 120 to its home position.

Figure 8:
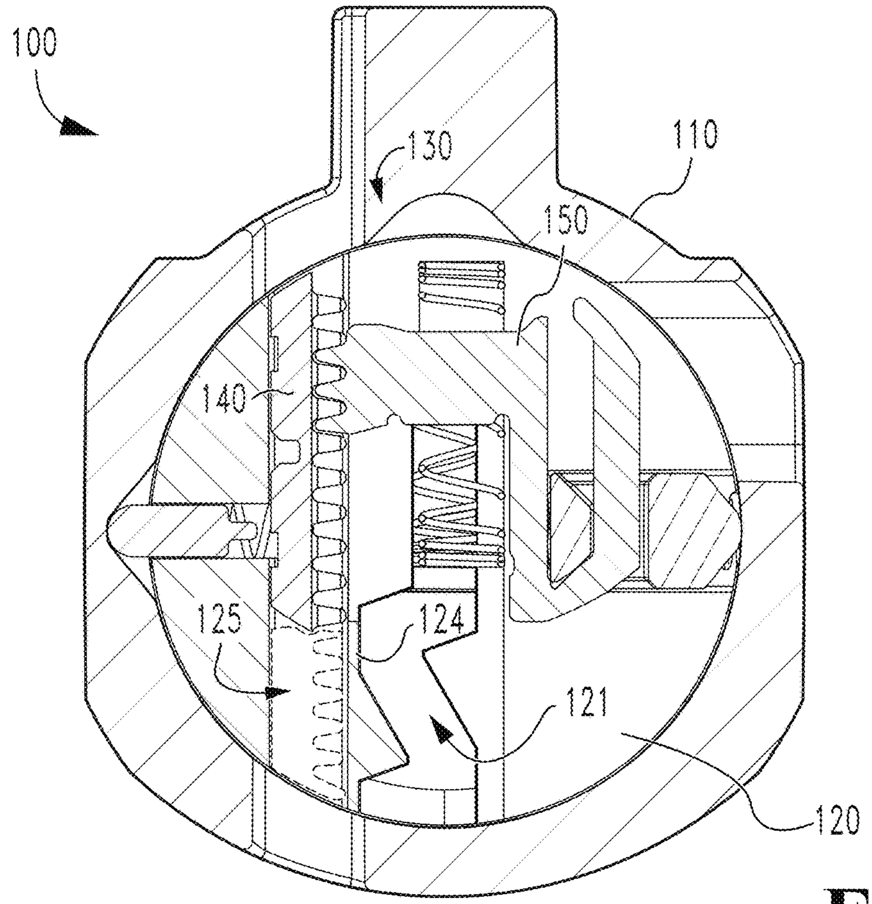
FIG. 8 is a cross-sectional illustration of the rekeyable lock cylinder with the tumbler mechanism in an uppermost displaced position.

With additional reference to FIG. 8, the plug 120 also includes a wall 124 defined between the keyway 121 and a portion of the tumbler shaft 123, thereby forming an obscured portion 125 of the tumbler shaft 123. As described herein, the wall 124 hides the obscured portion 125 from view, thereby preventing inspection of the obscured portion 125 via a scope 70 as described herein with reference to FIGS. 11 and 12. As described herein, a portion of the tumbler component 140 remains within the obscured portion 125 of the tumbler shaft 123 throughout the reciprocal range of the tumbler component 140 such that a portion of the tumbler component 140 is obscured both when the tumbler component 140 is in the lowermost or home position illustrated in FIG. 4 and the uppermost or most-displaced position illustrated in FIG. 8.

Figure 9:
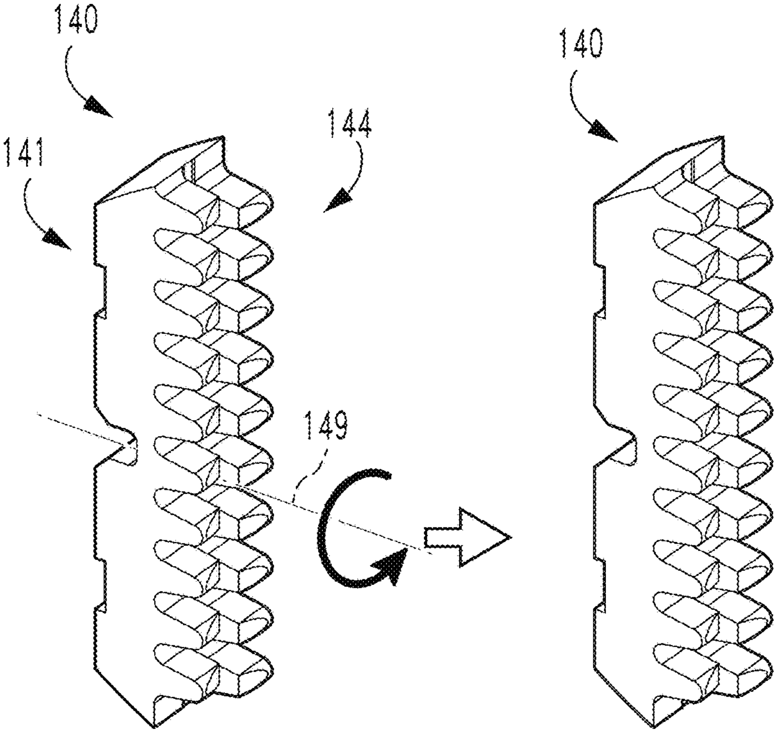
FIG. 9 illustrates a tumbler component with 180° rotational symmetry.

With additional reference to FIG. 9, as noted above, in the illustrated form, the engagement region 143 of the tumbler component 140 extends along the entire lateral length L140 of the tumbler component 140. Moreover, the illustrated tumbler component 140 exhibits 180° rotational symmetry such that the tumbler component 140 is operable to be installed to the tumbler shaft 123 in each of a first orientation and a second orientation opposite the first orientation without affecting operation of the lock cylinder 100. The illustrated tumbler component 140 exhibits 180° rotational symmetry about a transverse axis 149 that extends between the radially outer side 141 and the radially inner side 144 of the tumbler component 140. In certain forms, the radially inner side 144 of the tumbler component 140 may exhibit 180° rotational symmetry. In certain forms, the entire tumbler component 140 may exhibit 180° rotational symmetry.

In embodiments in which the tumbler component 140 exhibits 180° rotational symmetry, manufacture of the lock cylinder 100 may be facilitated. More particularly, the tumbler component 140 can be inserted to the tumbler shaft 123 in each and either of two opposite orientations without affecting operation of the lock cylinder 100. Stated another way, the lock cylinder 100 is equally operable with the tumbler component 140 in the first orientation and with the tumbler component 140 in the second orientation.

Figure 10:
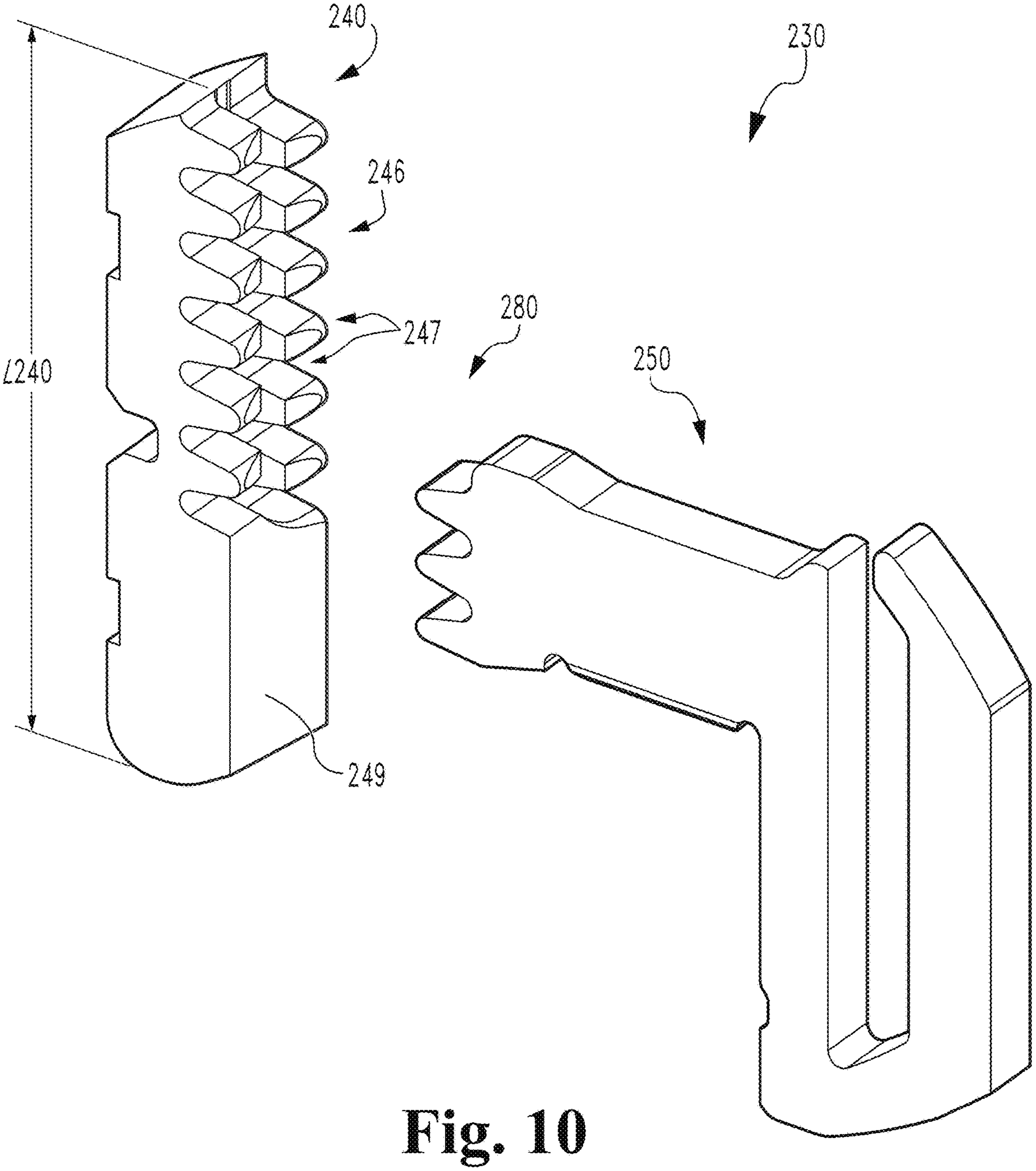
FIG. 10 is an exploded assembly view of a tumbler mechanism according to certain embodiments.

With additional reference to FIG. 10, illustrated therein is a tumbler mechanism 230 according to certain embodiments. The tumbler mechanism 230 is substantially similar to the above-described tumbler mechanism 130, and similar reference characters are used to denote similar elements and features. For example, the tumbler mechanism 230 generally includes a tumbler component 240, a key follower 250 and a selective coupling 280, which respectively correspond to the tumbler component 140, key follower 150, and selective coupling 180. In the interest of conciseness, the following description of the tumbler mechanism 230 focuses primarily on elements and features that are different from those described above with reference to the tumbler mechanism 130.

As noted above, the tumbler component 140 of the above-described tumbler mechanism 130 is fully toothed such that the engagement region 145 extends along the entirety of the lateral length L140 of the tumbler component 140. The tumbler component 240 illustrated in FIG. 10, by contrast, is only partially toothed. Stated another way, the engagement region 245 extends along only a portion of the lateral length L240 of the tumbler component such that an untoothed region 249 is defined adjacent the engagement region 245.

Figure 11:
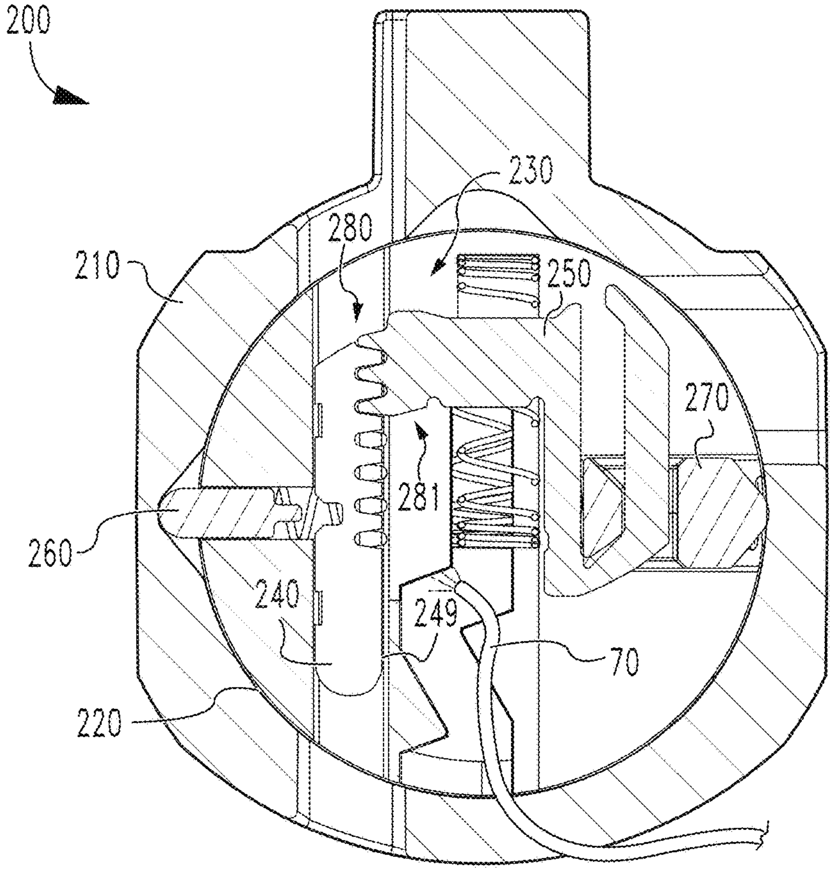
FIG. 11 is a cross-sectional illustration of a lock cylinder including the tumbler mechanism of FIG. 10 while the lock cylinder is being inspected via a scope.

With additional reference to FIG. 11, illustrated therein is a lock cylinder 200 including the tumbler mechanism 230. The lock cylinder 200 is substantially similar to the above-described lock cylinder 100, and similar reference characters are used to indicate similar elements and features. For example, in addition to the tumbler mechanisms 230, the lock cylinder 200 includes a shell 210, a plug 220, a locking sidebar 260, and a rekey sidebar 270, which respectively correspond to the shell 110, plug 120, locking sidebar 160, and rekey sidebar 170 described above. In the interest of conciseness, the following description of the lock cylinder 200 focuses primarily on elements and features that are different from those described above with reference to the lock cylinder 100.

Figure 12:
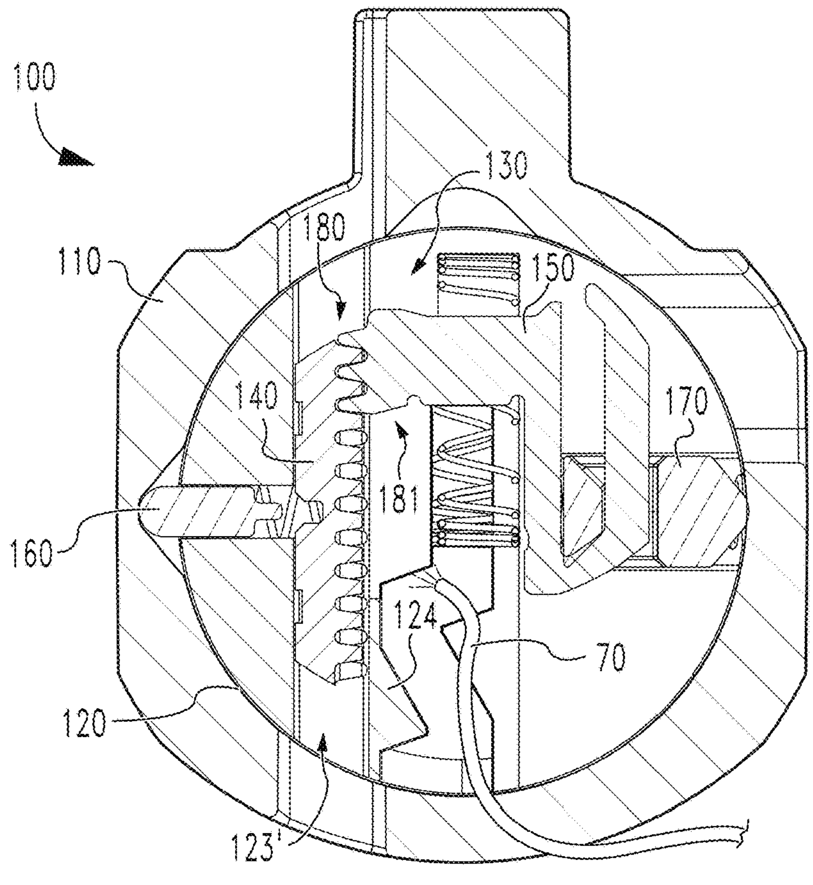
FIG. 12 is a cross-sectional illustration of the lock cylinder illustrated in FIGS. 1-9 while the lock cylinder is being inspected via a scope.

With continued reference to FIG. 11 and additional reference to FIG. 12, illustrated therein are lock cylinders 100, 200 with tumbler mechanisms 130, 230 in unlocking positions. More particularly, FIG. 11 illustrates the lock cylinder 200 with the tumbler mechanism 230 in its unlocking position, and FIG. 12 illustrates the lock cylinder 100 with the tumbler mechanism 130 in its unlocking position. Also illustrated in FIGS. 11 and 12 is a scope 70, which may be used in an attempt to decode the lock cylinders 100, 200.

One method of attempting to defeat the lock cylinder 200 involves raising the tumbler mechanisms 230 until the untoothed region 249 is visible over the wall 224, and thereafter using the scope 70 in an attempt to determine the corresponding digit of the key code based on the relative positions of the tumbler component 240 and key follower 250. More specifically, the attacker may use the scope 70 to count the number of engagement features (e.g., teeth or notches) between the untoothed region 249 and the area of engagement 281 for the selective coupler 280. For example, if there are a particular number of notches between the untoothed region 249 and the area of engagement 281, this fact may indicate to the attacker the code digit for the tumbler mechanism 230. Stated another way, because the code digit for a particular tumbler mechanism 230 corresponds to the number of open or unused engagement features 246 in the tumbler components 240, the code digit can be determined by counting the number of open or unused engagement features 246.

In contrast to the lock cylinder 200, in which the bitting code can be determined by visual inspection of the tumbler mechanisms 230, the lock cylinder 100 discourages determination of the bitting code in the manner described above. As illustrated in FIG. 12, the fully-toothed tumbler component 140 lacks the untoothed region 249, and therefore does not provide a landmark or reference point from which the attacker can begin to count. Moreover, because a portion of the tumbler component 140 remains within the obscured portion 125 of the tumbler shaft 123 throughout the reciprocal range of the tumbler component 140, the bottom of the tumbler component 140 likewise cannot be used as a reference point from which to start counting. As such, the attempt to decode the lock cylinder 100 via visual inspection of the tumbler mechanisms 130 may be thwarted.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A rekeyable lock cylinder, comprising:
- a shell extending along a longitudinal axis;
- a plug mounted for rotation about the longitudinal axis; and
- a tumbler mechanism operable to selectively prevent rotation of the plug relative to the shell, wherein the tumbler mechanism is slidable along a lateral axis and comprises:
  - a key follower comprising a first engagement feature; and
  - a tumbler component comprising a first end, a second end opposite the first end, and a plurality of second engagement features operable to engage the first engagement feature;
- wherein the tumbler component has a reciprocal range defined between a first terminal position in which the first end is adjacent the shell and a second terminal position in which the second end is adjacent the shell; and
- wherein the plurality of second engagement features are regularly spaced along an entire lateral length of the tumbler component between the first end and the second end.

2. The rekeyable lock cylinder of claim 1, wherein the tumbler component exhibits 180° rotational symmetry.

3. The rekeyable lock cylinder of claim 2, wherein the tumbler component is operable to be installed to a tumbler shaft of the plug in each of a first orientation and a second orientation opposite the first orientation; and wherein the rekeyable lock cylinder is equally operable with the tumbler component in the first orientation and with the tumbler component in the second orientation.

4. The rekeyable lock cylinder of claim 1, wherein a radially inner side of the tumbler component exhibits 180° rotational symmetry.

5. The rekeyable lock cylinder of claim 1, wherein the tumbler component comprises a rack defining the plurality of second engagement features; and wherein the rack extends the entire lateral length of the tumbler component.

6. The rekeyable lock cylinder of claim 1, further comprising a locking sidebar slidably mounted to the plug and operable to engage the tumbler mechanism; and wherein the tumbler mechanism operable to selectively prevent rotation of the plug relative to the shell by preventing radially inward movement of the locking sidebar.

7. A rekeyable lock cylinder, comprising:

a shell extending along a longitudinal axis;

a plug mounted for rotation about the longitudinal axis; and a tumbler mechanism operable to selectively prevent rotation of the plug relative to the shell, wherein the tumbler mechanism is slidable along a lateral axis and comprises:

a key follower comprising a first engagement feature; and a tumbler component comprising a plurality of second engagement features operable to engage the first engagement feature;

wherein the plurality of second engagement features are regularly spaced along an entire lateral length of the tumbler component;

wherein the plug further comprises:

a keyway;

a tumbler shaft in which the tumbler component is slidably received; and a wall positioned between the keyway and the tumbler shaft to thereby define an obscured portion of the tumbler shaft; and wherein a portion of the tumbler component remains within the obscured portion of the tumbler shaft throughout a reciprocal range of the tumbler component.

8. The rekeyable lock cylinder of claim 1, wherein the plurality of second engagement features comprises:

a plurality of first teeth projecting in a transverse direction from a radially inner side of the tumbler component; and a plurality of second teeth projecting in the transverse direction from the radially inner side of the tumbler component;

wherein the plurality of first teeth are offset from the plurality of second teeth in a lateral direction of the lateral axis; and wherein the plurality of first teeth are offset from the plurality of second teeth in a longitudinal direction of the longitudinal axis.

9. A rekeyable lock cylinder, comprising:

a shell;

a plug rotatably mounted in the shell;

a tumbler mechanism, comprising:

a tumbler component slidably mounted in the plug for movement along a lateral axis, wherein a radially outer side of the tumbler component comprises a groove, wherein a radially inner side of the tumbler component comprises a rack region including a plurality of teeth, and wherein the rack region extends along an entirety of a lateral length of the tumbler component; and a key follower operable to engage the teeth in each of a plurality of different engagement locations to thereby define a plurality of different unlocking positions for the tumbler mechanism, wherein each of the engagement locations corresponds to a respective one of the unlocking positions; and a locking sidebar operable to prevent rotation of the plug relative to the shell when the groove is misaligned with the sidebar;

wherein the tumbler component comprises a transverse axis extending between the radially inner side and the radially outer side; and wherein the tumbler component exhibits 180° rotational symmetry about the transverse axis.

10. The rekeyable lock cylinder of claim 9, wherein the tumbler component comprises a transverse axis extending between the radially inner side and the radially outer side;

wherein the tumbler component has a first orientation and a second orientation rotated 180° about the transverse axis relative to the first orientation; and wherein the rekeyable lock cylinder is equally operable with the tumbler component in the first orientation and with the tumbler component in the second orientation.

11. The rekeyable lock cylinder of claim 9, wherein the teeth are evenly spaced along the entirety of the lateral length of the tumbler component.

12. The rekeyable lock cylinder of claim 9, wherein the plug further comprises:

a keyway;

a tumbler shaft in which the tumbler component is slidably received; and a wall positioned between the keyway and the tumbler shaft to thereby define an obscured portion of the tumbler shaft; and wherein a portion of the tumbler component remains within the obscured portion of the tumbler shaft throughout a reciprocal range of the tumbler component.

13. The rekeyable lock cylinder of claim 9, wherein the groove is aligned with the locking sidebar when the key follower is engaged with the tumbler component at a current engagement location and the tumbler mechanism is in the unlocking position corresponding to the current engagement location.

14. The rekeyable lock cylinder of claim 9, wherein the rack region further comprises a plurality of second teeth extending from the radially inner side;

wherein the second teeth are offset from the teeth in a lateral direction of the lateral axis; and wherein the second teeth are offset from the teeth in a longitudinal direction of a rotational axis of the plug.

15. A rekeyable lock cylinder, comprising:

a shell;

a plug rotatably mounted in the shell, the plug comprising a tumbler shaft; and a tumbler mechanism operable to selectively prevent rotation of the plug relative to the shell, wherein the tumbler mechanism is mounted for sliding movement in the tumbler shaft and comprises:

a key follower comprising a first engagement feature; and a tumbler component comprising a plurality of second engagement features operable to engage the first engagement feature;

wherein the tumbler component is operable to be inserted into the tumbler shaft in each of a first orientation and a second orientation opposite the first orientation; and wherein the tumbler component exhibits rotational symmetry such that the rekeyable lock cylinder is equally operable with the tumbler component in the first orientation and with the tumbler component in the second orientation.

16. The rekeyable lock cylinder of claim 15, wherein the plug is rotatable about a longitudinal axis;

wherein the tumbler shaft extends along a lateral axis transverse to the longitudinal axis;

wherein the tumbler component has a transverse axis transverse to the longitudinal axis and the lateral axis; and wherein the tumbler component is operable to transition between the first orientation and the second orientation by rotating the tumbler component 180° about the transverse axis.

17. The rekeyable lock cylinder of claim 15, wherein the plurality of second engagement features are evenly spaced along an entire length of the tumbler component.

18. The rekeyable lock cylinder of claim 15, wherein the tumbler component comprises a rack defining the plurality of second engagement features.

19. The rekeyable lock cylinder of claim 15, wherein the plug further comprises a keyway and a wall positioned between the keyway and the tumbler shaft such that a portion of the tumbler shaft is obscured; and wherein a portion of the tumbler component remains within the obscured portion of the tumbler shaft throughout a reciprocal range of the tumbler component.

20. The rekeyable lock cylinder of claim 15, further comprising a locking sidebar; and wherein the tumbler mechanism is operable to selectively prevent rotation of the plug relative to the shell by selectively preventing radially inward movement of the locking sidebar.

* * * * *